(12) United States Patent
Choi et al.

(10) Patent No.: US 12,703,897 B2
(45) Date of Patent: Aug. 11, 2026

(54) METHOD OF PRODUCING AND REFINING CARRIER-FREE LUTETIUM-177 USING CHROMATOGRAPHY

(71) Applicant: KOREA ATOMIC ENERGY RESEARCH INSTITUTE, Daejeon (KR)

(72) Inventors: Kang Hyuk Choi, Daejeon (KR); Ul Jae Park, Daejeon (KR); Jun Sig Lee, Daejeon (KR); A Ran Kim, Yongin-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 437 days.

(21) Appl. No.: 18/269,411

(22) PCT Filed: Dec. 21, 2021

(86) PCT No.: PCT/KR2021/019479

§ 371 (c)(1),
(2) Date: Jun. 23, 2023

(87) PCT Pub. No.: WO2022/139398

PCT Pub. Date: Jun. 30, 2022

(65) Prior Publication Data

US 2024/0318283 A1 Sep. 26, 2024

(30) Foreign Application Priority Data

Dec. 24, 2020 (KR) ........................ 10-2020-0183771

(51) Int. Cl.
*C22B 59/00* (2006.01)
*B01D 15/18* (2006.01)
(Continued)

(52) U.S. Cl.
CPC .......... *C22B 59/00* (2013.01); *B01D 15/1871* (2013.01); *B01D 15/362* (2013.01);
(Continued)

(58) Field of Classification Search
CPC .. C22B 59/00; C22B 3/41; C22B 3/24; C22B 3/42; B01D 15/1871; B01D 15/362; B01D 16/426; G21G 1/001; G21G 2001/0094
See application file for complete search history.

(56) References Cited

U.S. PATENT DOCUMENTS

| | | | | |
|---|---|---|---|---|
| 6,716,353 | B1 | 4/2004 | Mirzadeh et al. | |
| 9,816,156 | B2 | 11/2017 | Marx et al. | |
| 2014/0294700 | A1* | 10/2014 | Marx | A61P 35/00 423/2 |

FOREIGN PATENT DOCUMENTS

| | | | |
|---|---|---|---|
| DE | 10 2011 051 868 | B4 | 2/2013 |
| JP | 2010-223827 | A | 10/2010 |

(Continued)

OTHER PUBLICATIONS

JP S63-270312 A machine translation and original document (Year: 1988).*

(Continued)

*Primary Examiner* — Tima M. McGuthry-Banks
(74) *Attorney, Agent, or Firm* — Sughrue Mion, PLLC

(57) ABSTRACT

The present invention relates to a method of producing and refining carrier-free lutetium-177 using chromatography, and more specifically to a method of producing and refining carrier-free lutetium 1-77 using chromatography having excellent resolution of lutetium and ytterbium without a concentration gradient of an eluent.

13 Claims, 9 Drawing Sheets

(51) Int. Cl.
*B01D 15/36* (2006.01)
*B01D 15/42* (2006.01)
*C22B 3/24* (2006.01)
*C22B 3/42* (2006.01)
*G21G 1/00* (2006.01)

(52) U.S. Cl.
CPC .............. *B01D 15/426* (2013.01); *C22B 3/24* (2013.01); *C22B 3/42* (2013.01); *G21G 1/001* (2013.01); *G21G 2001/0094* (2013.01)

(56) References Cited

FOREIGN PATENT DOCUMENTS

| | | | |
|---|---|---|---|
| KR | 10-2014-0101543 | A | 8/2014 |
| RU | 2013 140 279 | A | 3/2015 |
| RU | 2574921 | C1 | 2/2016 |
| WO | 2006/074960 | A1 | 7/2006 |

OTHER PUBLICATIONS

RU 2542733 C1 machine translation and original document (Year: 2015).*

ChEBI:65296—primary ammonium ion. ChEBI. https://www.ebi.ac.uk/chebi/CHEBI:65296 (Year: 2025).*

K.Hashimoto, et al. "Production of no-carrier-added $^{177}$Lu via the $^{176}$Yb(n,γ) $^{177}$Lu process", Journal of Radioanalytical and Nuclear Chemistry, 2003, vol. 255, No. 3, pp. 575-579 (5 pages).

Extended European Search report dated Oct. 21, 2024 in Application No. 21911465.9.

P.S. Balasubramanian, "Separation of Carrier-Free Lutetium-177 From Neutron Irradiated Natural Ytterbium Target", Journal of Radioanalytical and Nuclear Chemistry, Articles, 1994, pp. 305-310, vol. 185, No. 2.

International Search Report for PCT/KR2021/019479 dated Apr. 5, 2022.

Written Opinion for PCT/KR2021/019479 dated Apr. 5, 2022.

* cited by examiner

[FIG. 1]
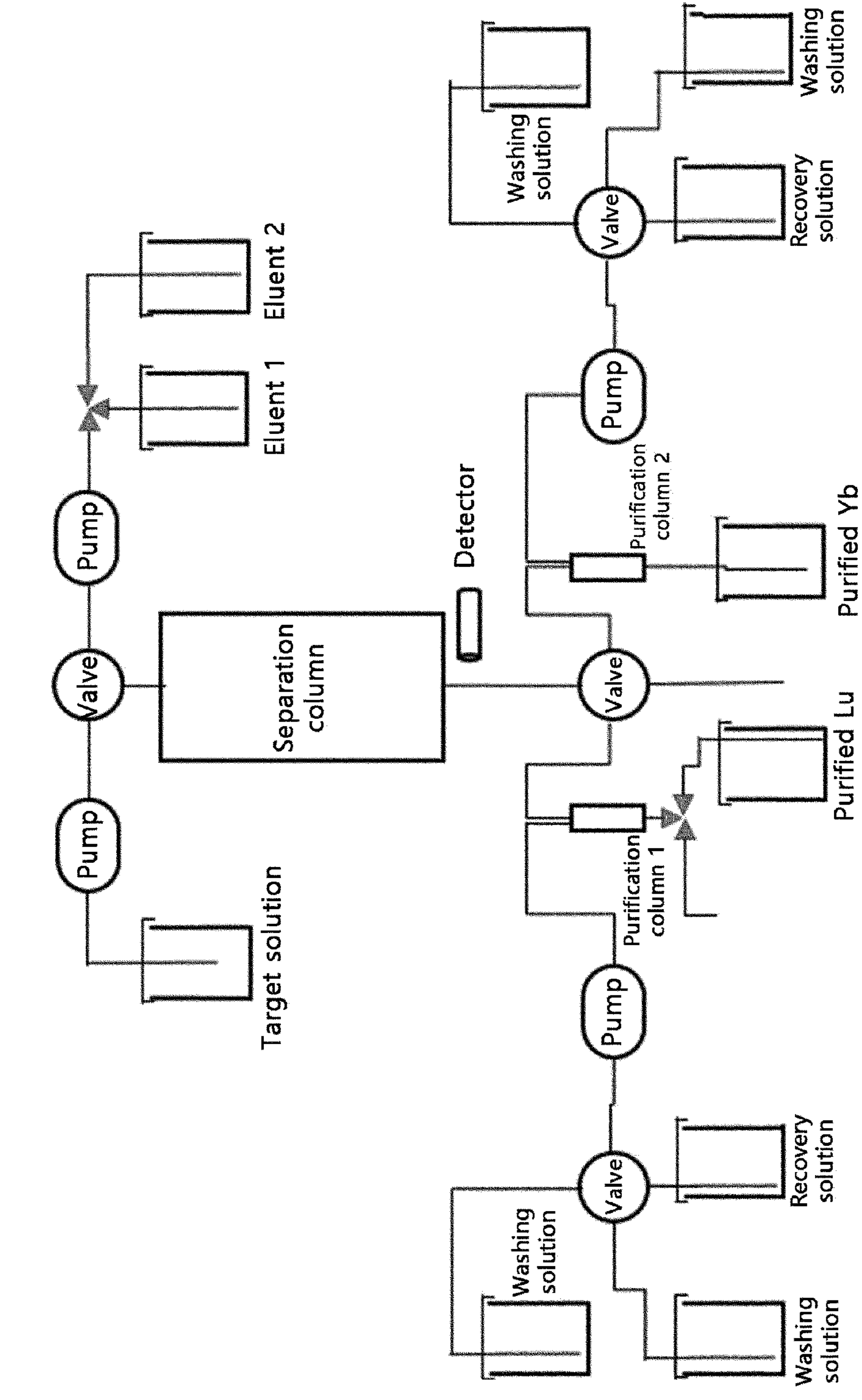

【FIG. 2】
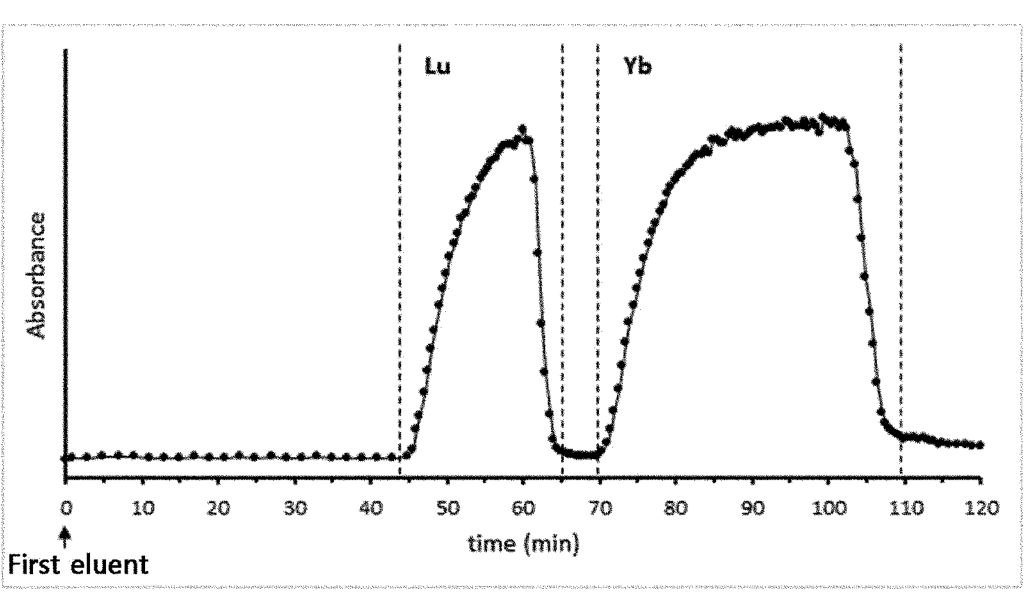

【FIG. 3】
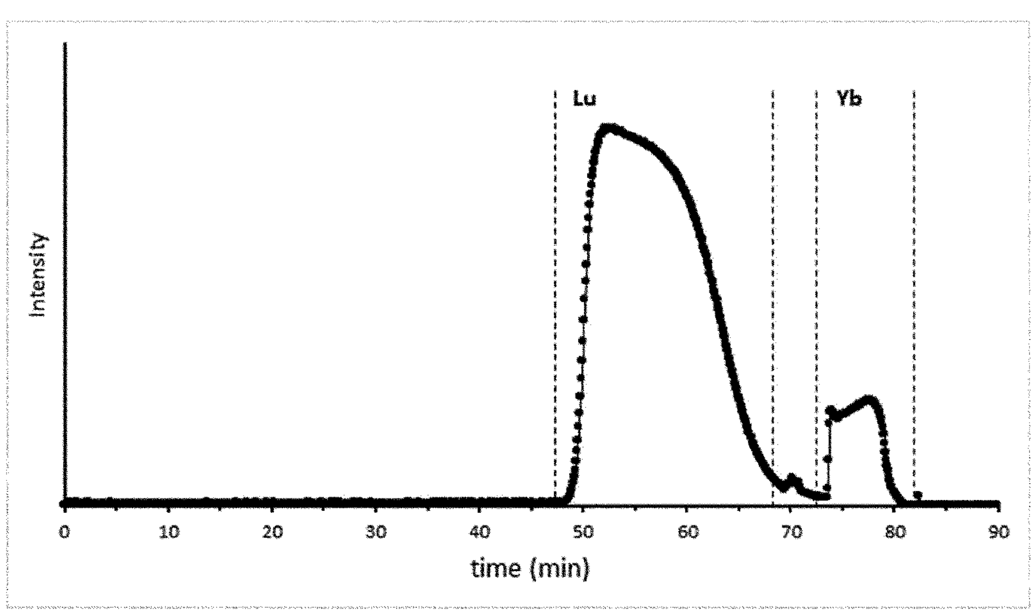

【FIG. 4】
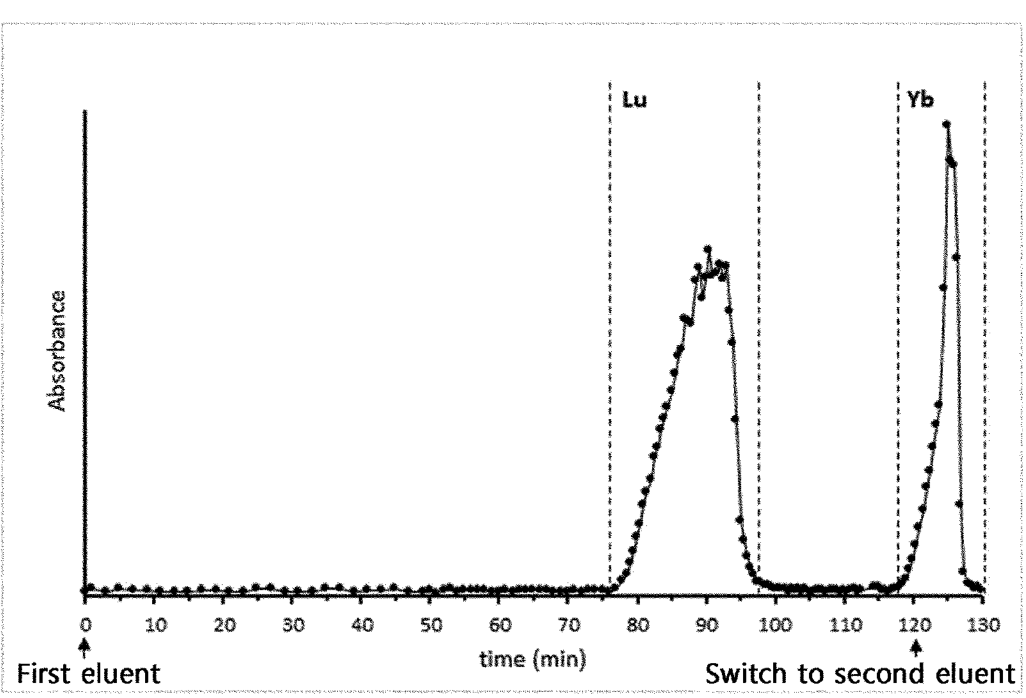

【FIG. 5】
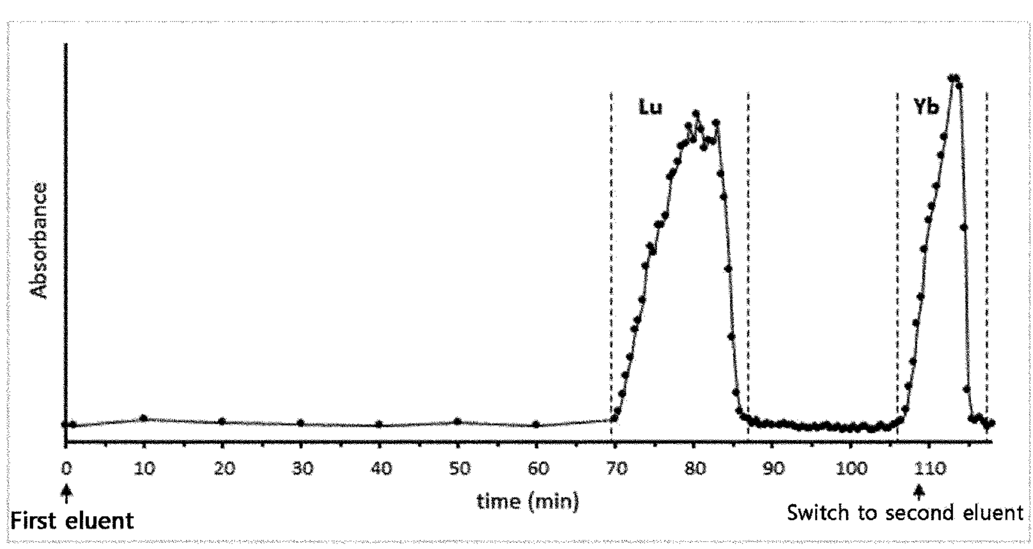

【FIG. 6】
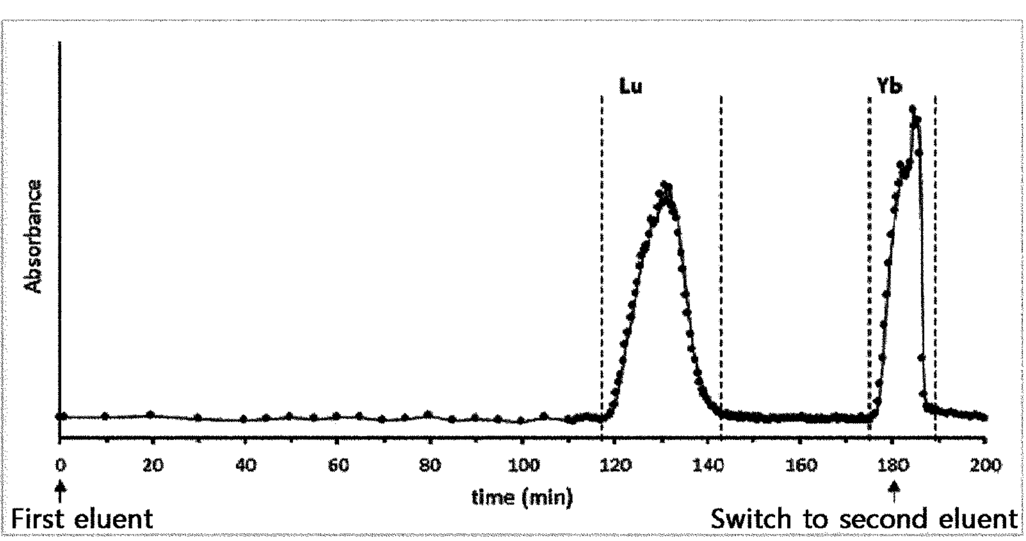

[FIG. 7]
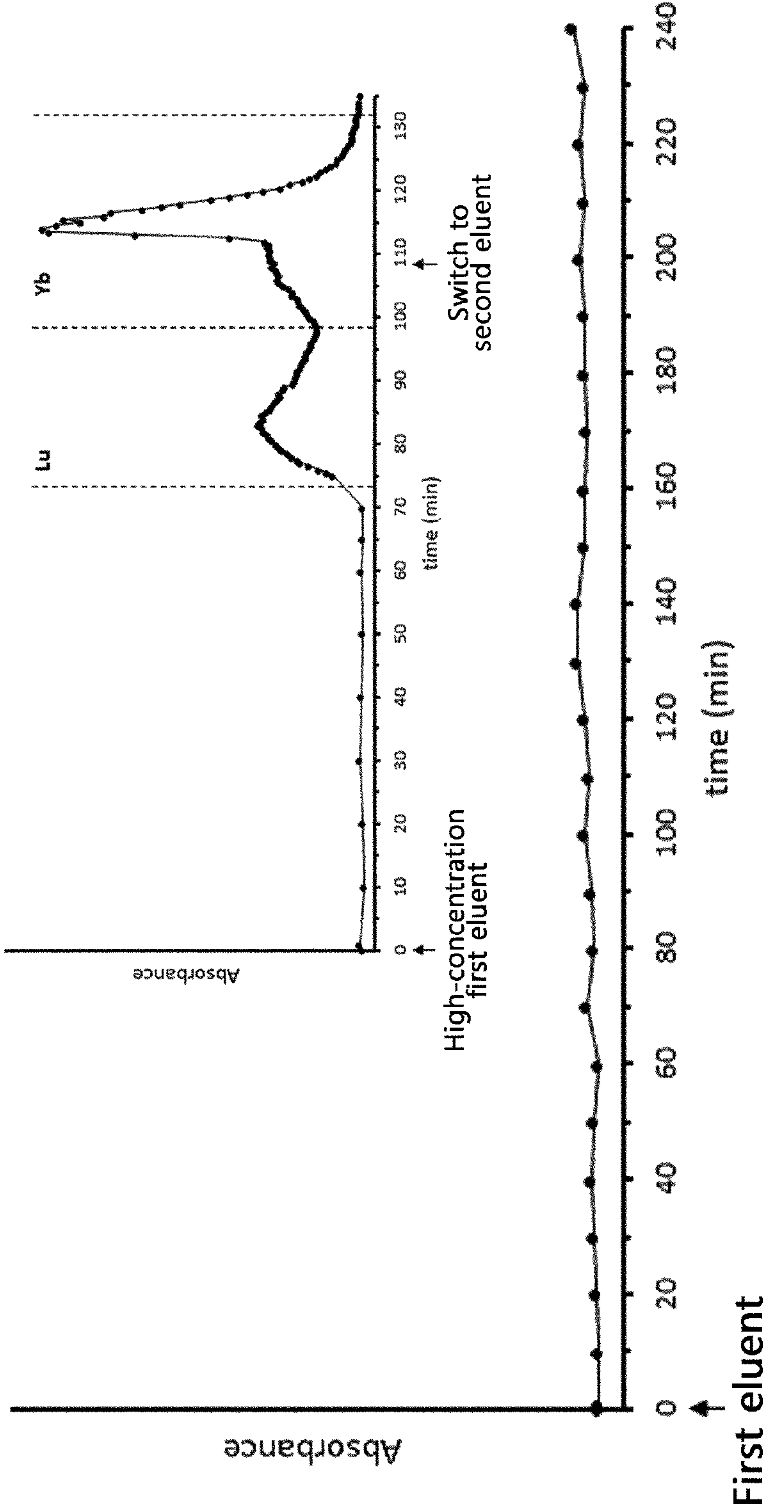

【FIG. 8】
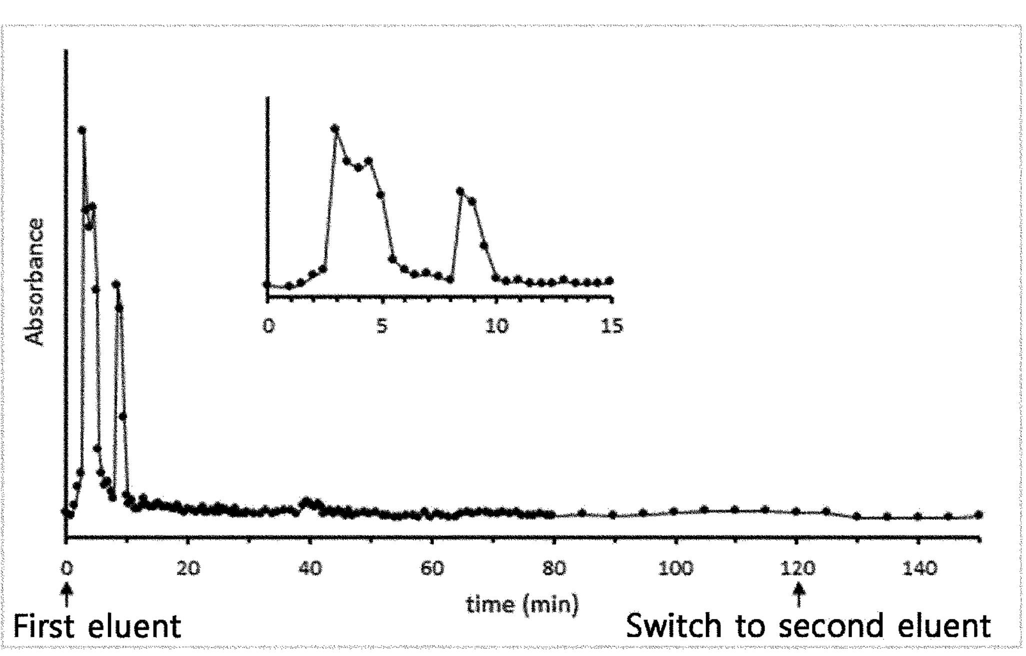

【FIG. 9】
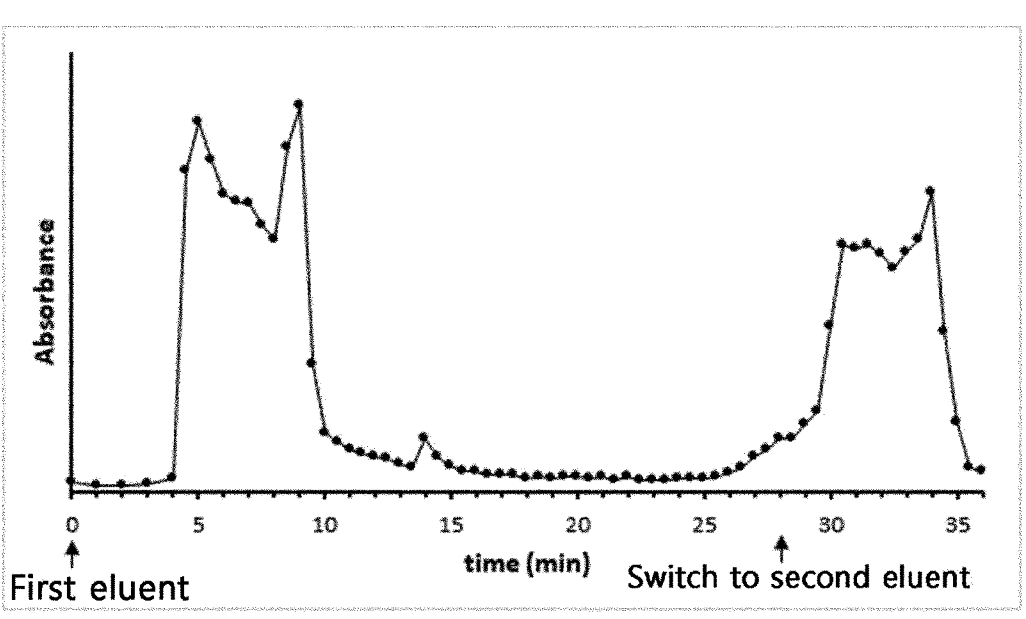

METHOD OF PRODUCING AND REFINING CARRIER-FREE LUTETIUM-177 USING CHROMATOGRAPHY

CROSS-REFERENCE TO RELATED APPLICATION

This application is a National Stage of International Application No. PCT/KR2021/019479 filed Dec. 21, 2021, claiming priority based on Korean Patent Application No. 10-2020-0183771, filed on Dec. 24, 2020, the disclosure of which is incorporated herein by reference in its entirety.

TECHNICAL FIELD

The present invention relates to a method of producing and refining carrier-free lutetium-177 using chromatography, and more specifically to a method of producing and refining carrier-free lutetium 1-77 using chromatography having excellent resolution of lutetium and ytterbium with an eluent at a single concentration without a concentration gradient of the eluent.

BACKGROUND ART

Among the lanthanide metals, beta-ray-emitting nuclides have received a lot of attention for their potential use in the medical field in the 1990s. In particular, since lutetium-177 (Lu-177) has the characteristics of beta emission ($E_{\beta max}$=498 KeV) and gamma emission ($E_{\gamma}$=208 KeV (11%) and 113 KeV (6.4%)), therapy and diagnosis are simultaneously possible, and thus, it is attracting attention as a radioactive isotope for tumor therapy.

For the use mainly for medical purposes, research is being conducted for tumor therapy by labeling a monoclonal antibody with Lu-177, and as a representative result product thereof, there is an example of Zevalin, which is used for the treatment of lymphoma. Recently, with the development of Lu-177 prostate-specific membrane antigen (PSMA), which is used as a therapeutic agent for prostate cancer, and Lutathera, which is a therapeutic agent for neuroendocrine tumor, the utility value of therapy using the radioactive isotope Lu-177 is increasing.

Lu-177 can be produced by direct and indirect production methods as follows.

Direct production method: Lu-176+$n$→Lu-177+γ [$^{176}$Lu($n$,γ)$^{177}$Lu]

Indirect production method: Yb-176+$n$→Yb-177+γ→Lu-177+$\beta^-$[$^{176}$Yb($n$,γ)β$^{177}$Lu]

Lu-177 produced by the direct production method has a very large nuclear reaction cross section of 2,090 bam, and thus, when 1 mg of the target of Lu-176 is irradiated with $1\times10^{14}$ neutron flux for 1 day, a quantity of 70 GBq (1.8 Ci) of Lu-177 is theoretically produced. This corresponds to a ratio of Lu-176 and Lu-177 of 100:1.6, which includes 1.6% of the radioactive isotope and the rest of Lu-176 as a carrier. If the irradiation time is increased, it is possible to obtain a Lu-177 radioisotope, which generally corresponds to 1 to 7%.

In the indirect production method, the nuclear reaction cross section of ytterbium-176 (Yb-176) is 2.85 barn, and under the above conditions, about 975 MBq (26.36 mCi) of Yb-177 and 85 MBq (2.3 mCi) of Lu-177 are produced. As for the production amount of isotopes, the indirect method produces only about 1 to 2% compared to the direct method.

Nevertheless, for the use as a pharmaceutical product, the presence of many carriers other than therapeutic radioisotopes is not preferred. This is because, in order to label a drug with a radioactive isotope produced by the direct method, a 20-fold to 100-fold higher amount of the labeling target is inevitably used, and thus, risks and side effects from therapy may be inherent to the patient.

In addition, Lu-177 produced by the direct production method is produced by including Lu-177m, which a radioactive isotope as a side reaction product. It exists as a carrier in an amount corresponding to about 0.4% and has a half-life of 160 days, which can act as a disadvantage in the treatment of patients and the processing of radioactive waste disposal and the like Although the production amount of Lu-177 using the direct production method is very high, it has a disadvantage of the high carrier content and the side reaction of Lu-177m, which inevitably has a low medical utility value.

In order to solve this problem, a technique of separating Lu-177, which is a target substance, has been developed using an indirect production method that targets and produces a target element and other elements. Research on the separation method of carrier-free lutetium has been in progress since the 1950s.

In 1956, G. R. Choppin performed column separation with a cation exchange resin under high temperature conditions using an ammonium HIBA (hydroxy isobutyrate) solution for the separation between lanthanide and actinide elements in J. Inorg. Nucl. Chem, and in 1994, P. S. Balasubramanian substituted $NH_4^+$, $Cd^{2+}$ and $Zn^{2+}$ in a cation exchange resin for Lu-177 separation, and then performed the separation using a HIBA solution as an eluent. In these methods, there may be a probability that $Cd^{2+}$ and $Zn^{2+}$ ions may exist even after the separation.

In U.S. Pat. No. 6,716,353 B1, the separation of Lu-177 was performed under acidic conditions using a resin including a phosphate group as an indirect production method. This method has a disadvantage in that Yb is eluted first and then Lu is eluted during column separation, and thus, Yb may be included in the separated Lu, which may limit its use as a pharmaceutical product.

In Germany, as a method of obtaining carrier-free Lu-177 through DE 102011051868.1 (Korean Patent Application Laid-Open No. 10-2014-0071324), there is a method of substituting the hydrogen ions of a cation exchange resin with ammonium ions in the first column (free column), loading the dissolved target and selecting one of several solutes such as HIBA and the like in the second column (main separation column) to separate and purify as a solution including ammonium ions. In this case, a total of three columns including the third column (purification column) are used. The main separation column is in a state where no pre-treatment is used, and the eluent is introduced into the cation exchange resin, and saturation and equilibrium with the cation exchange resin are repeated, proceeding from the top to the bottom of the column. The separation of Lu is achieved by forming a mutual equilibrium relationship with the functional group in the cation exchange resin and the eluent in a saturated state. Since this method requires time to achieve saturation, it takes a lot of time in terms of the separation time, and in order to solve this problem and increase the resolution, it was solved by providing an eluent gradient from a low concentration to a high concentration.

Accordingly, the situation is that it is necessary to develop a method for improving the resolution such that the separated lutetium does not include ytterbium, and a method for separating and purifying lutetium that does not need to provide an eluent gradient to increase the resolution and that can remove ions such as cadmium and the like after the separation.

DISCLOSURE

Technical Problem

The present invention has been devised to solve the aforementioned problems, and the problem to be solved by the present invention is to provide a method for separating and purifying lutetium-177 using chromatography, in which the resolution of lutetium and ytterbium is significantly improved compared to the conventional separation and purification methods.

Technical Solution

In order to solve the aforementioned problem, the present invention provides a method for separating carrier-free lutetium-177 (Lu-177), which sequentially performs chromatography for a mixture including a compound of ytterbium and lutetium-177 (Lu-177) produced by irradiating neutrons at a compound of ytterbium-176 (Yb-176) as a target by 2 columns below:

1) separation column: a separation column with a cation exchange resin as a stationary phase, and saturated with a first eluent including at least one of primary to quaternary aminium ions and a chelating agent in a column filled with the stationary phase; and 2) purification column: a purification column with the cation exchange resin as a stationary phase, and impregnated with water, wherein the first eluent is used as a mobile phase.

According to a preferred exemplary embodiment of the present invention, lutetium-177 (Lu-177) may be eluted first in the separation column, and then ytterbium (Yb) may be eluted.

According to a preferred exemplary embodiment of the present invention, the first eluent may be a single eluent without a concentration gradient.

According to a preferred exemplary embodiment of the present invention, when lutetium-177 is eluted in the separation column, the first eluent including the eluted lutetium-177 may be introduced into the purification column, and wherein when ytterbium is subsequently eluted in the separation column, a second eluent including at least one of primary to quaternary aminium ions and a chelate agent may be used as a mobile phase, and the separated ytterbium may be introduced into a separate column to perform chromatography to obtain ytterbium.

According to a preferred exemplary embodiment of the present invention, the cation exchange resin may include at least one selected from a sulfate group ($—SO_3H$), a phosphate group ($—OP(O)(OH)_2$ or $—P(O)(OH)_2$) and a carboxyl group (—C(O)OH).

According to a preferred exemplary embodiment of the present invention, the aminium ion may be an ion represented by Chemical Formula 1 below, a secondary to quaternary aminium ion including a heteroalipathic ring or heteroaromatic ring of 5 to atoms including a nitrogen atom in a ring, or a mixture thereof.

[Chemical Formula 1]

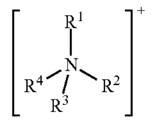

In Chemical Formula 1, at least one of $R^1$, $R^2$, $R^3$ and $R^4$ is a substituted or unsubstituted $C_1$ to $C_8$ linear or branched alkyl group and the rest is hydrogen, and the $R^1$, $R^2$, $R^3$ and $R^4$ are identical to or different from each other.

According to a preferred exemplary embodiment of the present invention, the substituted $C_1$ to $C_8$ linear or branched alkyl group may be substituted with a hydrophilic functional group.

In addition, according to a preferred exemplary embodiment of the present invention, the hydrophilic functional group may be each independently one selected from a hydroxyl group, a carbonyl group, an amine group, a carboxyl group, an ester group, an alkoxy group, an amide group, an imine group, an oxime group, a thiol group, a sulfide group, a sulfoxide group, a thioketone group and a thioester group.

According to a preferred exemplary embodiment of the present invention, the aminium ion may be a primary aminium ion.

According to a preferred exemplary embodiment of the present invention, the chelating agent may be a compound of $C_2$ to $C_{12}$ monocarboxylic acid, dicarboxylic acid, tricarboxylic acid or tetracarboxylic acid which further includes a hydrophilic functional group other than a carboxyl group, or a salt thereof.

According to a preferred exemplary embodiment of the present invention, the chelating agent may be 2-hydroxyisobutyric acid (2-HIBA).

According to a preferred exemplary embodiment of the present invention, the concentration of the chelating agent in the first eluent may be 0.01M to 0.5M.

According to a preferred exemplary embodiment of the present invention, the concentration of the chelating agent in the second eluent may be 0.1M to 1.0M.

According to a preferred exemplary embodiment of the present invention, the concentration of the aminium ion in the first eluent may be 0.01M to 1.0M.

Advantageous Effects

According to the method for separating lutetium-177 of the present invention, it is possible to produce carrier-free lutetium-177 due to the improved resolution without using a gradient eluent. Accordingly, it is also possible to achieve the effects of reducing the amount of expensive cation exchange resins used and the amount of waste generated, and the carrier-free lutetium-177 can be separated within a short period of time.

In addition, since the eluent without a concentration gradient is used, there is an advantage in that the eluent can be recycled, and the separation and purification processes can be simplified.

DESCRIPTION OF DRAWINGS

FIG. 1 is a diagram schematically showing the structure of an apparatus for the separation of lutetium-177 according to a preferred exemplary embodiment of the present invention.

FIG. 2 is a chromatogram in which an eluent including ammonium ions and HIBA is saturated in a separation column filled with a cation exchange resin, and stable isotopes of lutetium and ytterbium are separated.

FIG. 3 is a chromatogram in which an eluent including ammonium ions and HIBA is saturated in a separation column filled with a cation exchange resin, and radioisotopes of lutetium and ytterbium are separated.

FIG. 4 is a chromatogram in which an eluent including methylamine cations and HIBA is saturated in a cation exchange resin column, and stable isotopes of lutetium and ytterbium are separated.

FIG. 5 is a chromatogram in which an eluent including ethylamine cations and HIBA is saturated in a separation column filled with a cation exchange resin, and stable isotopes of lutetium and ytterbium are separated.

FIG. 6 is a chromatogram in which an eluent including ethanolamine cations and HIBA is saturated in a separation column filled with a cation exchange resin, and stable isotopes of lutetium and ytterbium are separated.

FIG. 7 is a chromatogram in which an eluent including diethylamine cations and HIBA is saturated in a separation column filled with a cation exchange resin, and stable isotopes of lutetium and ytterbium are separated.

FIG. 8 is a chromatogram in which an eluent including ethylenediamine cations and HIBA is saturated in a separation column filled with a cation exchange resin, and stable isotopes of lutetium and ytterbium are separated.

FIG. 9 is a chromatogram in which an eluent including methylamine cations and HIBA is saturated in a separation column filled with a silica support-based cation exchange resin, and stable isotopes of lutetium and ytterbium are separated.

BEST MODE

According to the method for separating lutetium-177 of the present invention, it is possible to produce carrier-free lutetium-177 due to the improved resolution without using a gradient eluent. Accordingly, it is also possible to achieve the effects of reducing the amount of expensive cation exchange resins used and the amount of waste generated, and the carrier-free lutetium-177 can be separated within a short period of time.

In addition, since the eluent without a concentration gradient is used, there is an advantage in that the eluent can be recycled, and the separation and purification processes can be simplified.

Modes of the Invention

As described above, it was difficult to obtain high-purity lutetium-177 by the conventional lutetium separation method, and it had disadvantages that it required a lot of time for separation, such as requiring many separation columns and the like, and required a concentration gradient as an eluent.

Accordingly, as a result of devoting efforts to research and development in order to solve these problems, the inventors of the present invention have derived the present invention.

The present invention follows the indirect production method targeting ytterbium-176 (Yb-176) instead of the direct production method, which is a method of irradiating neutrons by targeting lutetium-176, which is an isotope of lutetium-177 (Lu-177). When the direct production method is followed, the ratio of lutetium-177 in the produced lutetium is within about 2%, and there is a problem in that the ratio of the carrier is very high. The indirect production method produces less isotope lutetium-177 compared to the direct production method, but the content of other isotopes is small and the amount of side reaction products is remarkably small, and thus, when lutetium is separated from the mixture with high purity, it has an advantage of having more excellent utility as a medical label.

A schematic reaction formula of the neutron capture reaction of the indirect production method is as follows.

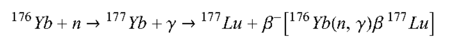

$$^{176}Yb + n \rightarrow {}^{177}Yb + \gamma \rightarrow {}^{177}Lu + \beta^- \left[{}^{176}Yb(n, \gamma)\beta\, {}^{177}Lu\right]$$

The present invention specifically relates to a method for separating lutetium-177 produced by the neutron capture reaction from ytterbium (ytterbium-176 and ytterbium-177). The separation method is by chromatography, and the present invention has confirmed that the resolution of the chromatogram is significantly different as the stationary phase and the mobile phase of the column are adjusted, and accordingly, it has provided a method for separating carrier-free lutetium-177 that can save time and costs.

The method for separating carrier-free lutetium-177 according to the present invention is a method for separating a mixture including a compound of ytterbium and lutetium-177 (Lu-177) produced by irradiating neutrons to a compound of ytterbium-176 (Yb-176) according to the indirection production method by sequential chromatography using the following two-step columns.

1) Separation column: a separation column with a cation exchange resin as a stationary phase, and saturated with a first eluent including at least one of primary to quaternary aminium ions and a chelating agent in a column filled with the stationary phase; and 2) Purification column: a purification column with the cation exchange resin as a stationary phase, and impregnated with water.

Herein, the mobile phase in the separation column is the first eluent.

Chromatography in the separation column may finely change the polarity of an eluent by including one or more primary to quaternary aminium ions ($NR_4^+$, R is each independently an alkyl group or hydrogen) substituted with one or more alkyl groups together with ammonium ions ($NH_4^+$), or instead of ammonium ions introduced together with a chelating agent to adjust the pH of the eluent in the conventional lutetium separation method.

When aminium ions are used, the theoretical plate of the separation column may be improved to increase the retention times of lutetium-177 and ytterbium. Accordingly, while shortening the length of the column, it is possible to have the same resolution as the conventional lutetium separation method, and there is an advantage in that the amount of the cation exchange resin used may be reduced.

The aminium ion may be an ion represented by Chemical Formula 1 below, a secondary to quaternary aminium ion including a heteroalipathic ring or heteroaromatic ring of 5 to 30 atoms including a nitrogen atom in a ring, or a mixture of two or more thereof.

[Chemical Formula 1]

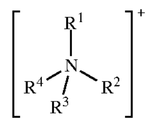

In Chemical Formula 1, at least one of $R^1$, $R^2$, $R^3$ and $R^4$ is a substituted or unsubstituted $C_1$ to $C_8$ linear or branched alkyl group and the rest is hydrogen, and the $R^1$, $R^2$, $R^3$ and $R^4$ are identical to or different from each other.

Herein, the substituted alkyl group means that a reactive functional group is bound to at least one carbon of the alkyl group, and the reactive functional group preferably means a hydrophilic functional group.

Preferably, the hydrophilic functional group may be each independently one selected from a hydroxyl group, a carbonyl group, an amine group, a carboxyl group, an ester group, an alkoxy group, an amide group, an imine group, an oxime group, a thiol group, a sulfide group, a sulfoxide group, a thioketone group and a thioester group.

More preferably, it means a hydroxyl group.

The column retention time of lutetium-ytterbium in the column has a tendency for ammonium ions<primary aminium ions<hydroxy primary aminium ions< secondary aminium ions<tertiary aminium ions<quaternary aminium ions, depending on the ions included in the eluent. This is also consistent with the tendency of the column separation time.

As the order of the amine increases, that is, since the quaternary aminium ions have a lower material polarity than the primary aminium ions, the lanthanide compounds stay longer in the cation exchange resin in the equilibrium relationship with the cation exchange resin, and as a result, the column retention time becomes longer. Therefore, the chromatography in the case of including high-order aminium ions increases the elution time compared to the case of using an eluent including low-order aminium ions.

Conversely, as the order is lowered, that is, since the ammonium ions have a higher material polarity than the primary or quaternary aminium ions, the equilibrium of the mobile phase is more biased than that of the cation exchange resin, which is a stationary phase, and thus, the column retention time is reduced.

Each of ytterbium and lutetium has different equilibrium relationships and binding affinities between the cation exchange resin as a stationary phase and the eluent as a mobile phase, and eventually the theoretical plate is formed for each ion.

If the mobile phase is changed by changing the aminium ion of the mobile phase, each of ytterbium and lutetium causes changes in the equilibrium relationship and binding affinity between the eluent and the stationary phase, resulting in a difference in resolution.

Since the method for separating lutetium-177 according to the present invention has significantly improved resolution of lutetium compared to the conventional method of using an eluent including ammonium ions, it has an advantage of being able to obtain carrier-free lutetium-177 with high purity even though lutetium is obtained by the indirect production method.

In a preferred exemplary embodiment of the present invention, the aminium ion may include a primary aminium ion or a primary aminium ion substituted with a hydroxyl group, and more preferably, a primary aminium ion substituted with an alkyl group having a small number of carbon atoms, or a methylamine cation, an ethylamine cation and an ethanolamine cation, which are aminium ions substituted with a hydroxyl group in the amine.

In this case, not only the first elution time is suitable within 2 hours compared to the case of including high-order aminium ions, but also the resolution of the case of using the primary amine is improved, and in addition, the elution between lutetium and ytterbium is remarkably distinguished, and it is more advantageous because the elution time is short.

In a preferred exemplary embodiment of the present invention, the concentration of the chelating agent in the first eluent may be 0.01 to 0.5M, and the concentration of the aminium ions may be 0.01M to 1.0M.

If the concentration of the chelating agent and aminium ions is less than 0.01M, there may be a problem in that the elution time becomes longer, and conversely, if the concentration is more than 0.5M, there may be a problem in that it is difficult to separate lutetium-177 from ytterbium because the elution time is rapidly shortened.

In addition, preferably, the chelating agent may be a compound of $C_2$ to $C_{12}$ monocarboxylic acid, dicarboxylic acid, tricarboxylic acid or tetracarboxylic acid which further includes a hydrophilic functional group other than a carboxyl group, or a salt thereof.

For example, the chelating agent may be one selected from 2-hydroxyisobutyric acid (2-HIBA), 3-hydroxybutyric acid (3-HIBA), 3 -hydroxypropanoic acid, tartaric acid, lactic acid, citric acid and glycolic acid.

More preferably, the chelating agent may be 2-HIBA. When 2-HIBA is used as a chelating agent, there is an advantage in that it may be easily separated and removed compared to other compounds due to the good formation of a weak chelate with metal ions in the structure.

In addition, the cation exchange resin is a stationary phase of the separation column and the purification column, and the type of the resin may be the same or different in the separation column and the purification column.

The cation exchange resin may include at least one selected from a sulfate group ($—SO_3H$), a phosphate group ($—OP(O)(OH)_2$ or $—P(O)(OH)_2$) and a carboxyl group ($—C(O)OH$).

In addition, for the cation exchange resin, it is preferable to use a resin including at least one selected from the sulfate group, phosphate group and carboxyl group with a polymer, an inorganic substance or a mixture of a polymer and an inorganic substance as a support.

More preferably, the cation exchange resin may be at least one selected from resins of materials having a sulfate group in the form of polymers. However, the present invention is not necessarily limited thereto, and a suitable one may be selected from the cation exchange resins generally used in the art according to the polarity, pH, and separation conditions of an eluent.

In addition, the separation method of the present invention is characterized in that the separation column is saturated with an eluent before injecting the eluent. By including an eluent in the separation column in advance, there is an advantage in that the separation may be easily performed even with a single eluent without using an eluent having a concentration gradient. If the separation is performed without saturating with an eluent in advance, the total separation time becomes longer because the separation proceeds while the eluent flows to create equilibrium with the column, and thus, the use of an eluent having a concentration gradient is forced.

According to a preferred exemplary embodiment of the present invention, lutetium may be eluted first in the separation column, and then ytterbium may be eluted.

In addition, the eluted lutetium may be introduced into a purification column using the eluted solution itself as an eluent. Subsequently, the eluted ytterbium may be purified by a separate column different from the purification column.

FIG. 1 is a schematic structural diagram of an apparatus for the separation of carrier-free lutetium-177 according to the present invention. Referring to FIG. 1, it can be confirmed that Purification Column 1 for purifying lutetium which is eluted first from the separation column and Purification Column 2 for purifying ytterbium which is subsequently eluted are separately provided.

In a preferred exemplary embodiment of the present invention, a mixture of lutetium and ytterbium to be introduced into the separation column is dissolved with hydrochloric acid or nitric acid to form a $M^{3+}(Cl^-)_3$ or $M^3(NO_3^-)_3$ compound, and then heated to remove excess acid, and it may be in the form of dissolving the same in water.

However, the form of the mixture to be introduced into the column may be selected within the range of a level that may be substituted or changed by exerting ordinary creativity in the generally used method and the conventional method.

In addition, lutetium-177 which is purified through a purification column may be obtained in the form of a required compound using the conventional method, and this method is within the scope of practice by those skilled in the art.

Hereinafter, the present invention will be described in more detail with reference to examples. However, it should be understood that the scope of the technical spirit of the present invention is not limited to the following examples, and the contents disclosed in the examples are only illustrative so that the present invention can be understood more specifically.

EXAMPLE

Comparative Example 1

An aqueous solution adjusted to pH 4.2 by adding 2-HIBA (0.07M) as a chelating agent and 25% aqueous ammonia in a separation column (a cylindrical column with a diameter of 10 mm and a height of 70 mm) filled with a stationary-phase cation exchange resin containing a sulfate group was used as a first eluent, and it was injected until the column was completely saturated.

50 mg of ytterbium oxide ($Yb_2O_3$) was irradiated with neutrons for 5 days in $1\times10^{14}$ neutrons in a research reactor. The formed ytterbium oxide-lutetium mixture ($Yb_2O_3$-$^{177}Lu_2O_3$) was dissolved in saturated hydrochloric acid (c-HCl, 11.4M) to prepare a metal chloride (MCl, the M is an arbitrary metal ion) state. Excess acid was removed by heating the prepared sample, and 1 mL of water was added to prepare an $YbCl_3$-$^{177}LuCl_3$ aqueous solution.

Elution was carried out while flowing the $YbCl^3$-$^{177}LuCl^3$ aqueous solution through the separation column at a rate of 1.5 mL/min.

First, the eluent including the eluted lutetium-177 compound was injected into a purification column (a cylindrical column with a diameter of 5 mm and a height of 20 mm) filled with the same cation exchange resin as the separation column and saturated with water.

The purification column in which the lutetium-177 compound was collected was washed with a washing solution to remove organic and inorganic components in the eluent. Afterwards, lutetium-177 was recovered in the purification column using a recovery solution including a strong acid. The recovered solution was heated to 150° C. to remove the acid component, and then dissolved in 1 mL of 0.01M hydrochloric acid to obtain high-purity carrier-free lutetium-177.

The elution time in the separation column was 40 minutes or more.

The elution of lutetium and ytterbium was measured through a gamma-ray detector, and the chromatogram for each case is shown in FIG. 3.

Comparative Example 2

It was carried out in the same manner as in Comparative Example 1, but a mixture of ytterbium oxide and lutetium oxide that was not irradiated with neutrons was treated in the same manner to prepare a mixture of ytterbium chloride and lutetium chloride as a sample, and the same separation and purification processes were performed.

The eluted lutetium and ytterbium were measured using a UV detector, and the chromatogram is shown in FIG. 2.

Example 1

It was carried out in the same manner as in Comparative Example 2, except that the first eluent including methylaminium ions, which are primary aminium ions, at the same concentration was used instead of aqueous ammonia.

The elution of lutetium was obtained from 77 minutes for about 20 minutes, and at 120 minutes, in order to facilitate the recovery of ytterbium, which was the target material, elution was performed by replacing with a second eluent (0.2M HIBA aqueous solution adjusted to pH 4.2 using methylaminium), which was a pH 4.2 aqueous solution including 0.2 M HIBA.

Similarly, the chromatogram obtained through the same detector is shown in FIG. 4.

Example 2

It was carried out in the same manner as in Comparative Example 2, except that the first eluent including ethylaminium ions, which are primary aminium ions, at the same concentration was used instead of aqueous ammonia.

The elution of lutetium was obtained from 70 minutes for about 20 minutes, and at 110 minutes, in order to facilitate the recovery of ytterbium, which was the target material, elution was performed by replacing with a second eluent (0.2M HIBA aqueous solution adjusted to pH 4.2 using ethylaminium) at a higher concentration than the first eluent.

Similarly, the chromatogram obtained through the same detector is shown in FIG. 5.

Example 3

It was carried out in the same manner as in Comparative Example 2, except that the first eluent including ethanolaminium ions, which are primary aminium ions substituted with a hydroxyl group, at the same concentration was used instead of aqueous ammonia.

The elution of lutetium was performed from about 120 minutes for about 24 minutes, and at 177 minutes, in order to facilitate the recovery of ytterbium, which was the target material, elution was performed with a second eluent (0.2M HIBA aqueous solution adjusted to pH 4.2 using ethanolaminium) at a higher concentration than the first eluent.

Similarly, a chromatogram obtained through the same detector is shown in FIG. 6.

Example 4

It was carried out in the same manner as in Comparative Example 2, except that the first eluent including diethyl aminium ions, which are secondary aminium ions, at the same concentration was used instead of aqueous ammonia.

As a result of the elution, lutetium was not eluted for 4 hours or more.

As a result of eluting with a second eluent (0.2 M HIBA aqueous solution adjusted to pH 4.2 using diethylaminium), lutetium started to be eluted at 70 minutes, but it was confirmed that it was eluted by being mixed with ytterbium.

The chromatogram obtained through the same detector is shown in FIG. 7.

Example 5

It was carried out in the same manner as in Comparative Example 2, except that the first eluent including ethylenediamine ions, which are primary aminium ions substituted with an amino group, at the same concentration was used instead of aqueous ammonia.

As a result of eluting with the first eluent, lutetium and ytterbium were separated within 15 minutes. Ytterbium was also detected in some lutetium fractions during re-experiment.

The chromatogram obtained through the same detector is shown in FIG. 8.

Example 6

It was carried out in the same manner as in Comparative Example 2, except that a silica support was used as a cation exchange resin, and the first eluent including methylaminium ions, which are primary aminium ions, at the same concentration was used instead of aqueous ammonia.

As a result of eluting with the first eluent, it was confirmed that lutetium was eluted 4 minutes after the elution, and eluted over about 7 minutes. As a result of confirming the metal component of the separated eluent, some ytterbium was also confirmed.

The chromatogram obtained through the same detector is shown in FIG. 9.

Table 1 below shows the elution times of lutetium and ytterbium, respectively, when elution was performed by the methods according to the examples and comparative examples.

TABLE 1

| Classification | Start of Lu elution (minute) | End of Lu elution (minute) | Elution time interval (minute) | Start of Yb elution (minute) | Remark |
|---|---|---|---|---|---|
| Comparative Example 1 | 45 | 65 | 6 | 71 | |
| Comparative Example 2 | 47 | 68 | 6 | 74 | |
| Example 1 | 77 | 98 | 20 | 118 | |
| Example 2 | 70 | 87 | 20 | 107 | |
| Example 3 | 118 | 143 | 34 | 177 | |
| Example 4 | — | — | — | — | No elution for 4 hours or more |
| Example 5 | 3 | 7 | 1 | 8 | Lu and Yb were eluted almost at the same time |
| Example 6 | 4 | 11 | 0 | 4 | |

As can be confirmed in Table 1 above, in the separation methods according to Examples 1 to 3 using primary aminium or hydroxy-substituted primary aminium ions in the eluents instead of ammonium ions, the elution time was slightly longer, but it was confirmed that the separation clearly occurred by having a significant time interval between lutetium and ytterbium. In Example 4, the resolution was further improved by using secondary aminium ions, but instead, there was a disadvantage in that the elution time was increased by nearly two times.

In Example 5, it was found that by using aminium ions having two amino groups, the resolution was rather poor compared to the ammonium ions.

In Example 6, it was confirmed that the resolution was rather reduced as a result of using the silica support for the stationary phase.

INDUSTRIAL APPLICABILITY

According to the method for separating lutetium-177 of the present invention, it is possible to produce carrier-free lutetium-177 due to the improved resolution without using a gradient eluent. Accordingly, it is possible to achieve the effects of reducing the amount of expensive cation exchange resins used and the amount of waste generated, and the carrier-free lutetium-177 can be separated within a short period of time.

In addition, since the eluent without a concentration gradient is used, there is an advantage in that the eluent can be recycled, and the separation and purification processes can be simplified.

The invention claimed is:

1. A method for separating carrier-free lutetium-177 (Lu-177), which sequentially performs chromatography for a mixture comprising a compound of ytterbium and lutetium-177 (Lu-177) produced by irradiating neutrons at a compound of ytterbium-176 (Yb-176) as a target by 2 columns below:

1) separation column: a separation column with a cation exchange resin as a stationary phase, the separation column being filled with the stationary phase and being saturated with a first eluent comprising primary aminium ions and a chelating agent, and the first eluent being used as a mobile phase in the separation column; and 2) purification column: a purification column with the cation exchange resin as a stationary phase, and impregnated with water, wherein the first eluent is introduced from the separation column into the purification column wherein the first eluent is a single eluent without a concentration gradient.

2. The method of claim 1, wherein lutetium-177 (Lu-177) is eluted first in the separation column, and then ytterbium (Yb) is eluted from the separation column.

3. The method of claim 2, wherein when lutetium-177 is eluted from the separation column, the first eluent comprising the eluted lutetium-177 is introduced into the purification column, and wherein when the separation of lutetium-177 is completed or when ytterbium is eluted from the separation column, a second eluent comprising at least one of primary to quaternary aminium ions and a chelate agent is used as a mobile phase, and the ytterbium from the separation column is introduced into a separate column to perform chromatography to obtain ytterbium.

4. The method of claim 3, wherein the concentration of the chelate agent and the primary to quaternary aminium ions of the second eluent is higher than that of the first eluent.

5. The method of claim 3, wherein the concentration of the chelating agent in the second eluent is 0.1M to 1.0M.

6. The method of claim 1, wherein the cation exchange resin comprises at least one selected from a sulfate group ($-SO_3H$), a phosphate group ($-OP(O)(OH)_2$ or $-P(O)(OH)_2$) and a carboxyl group ($-C(O)OH$) in an organic, inorganic or organic-inorganic mixture support.

7. The method of claim 1, wherein the primary aminium ions have $C_1$ to $C_8$ linear or branched alkyl group substituted or unsubstituted with a hydrophilic functional group.

8. The method of claim 7, wherein the hydrophilic functional group is each independently one selected from a hydroxyl group, a carbonyl group, an amine group, a carboxyl group, an ester group, an alkoxy group, an amide group, an imine group, an oxime group, a thiol group, a sulfide group, a sulfoxide group, a thioketone group and a thioester group.

9. The method of claim 1, wherein the chelating agent is a compound of $C_2$ to $C_{12}$ monocarboxylic acid, dicarboxylic acid, tricarboxylic acid or tetracarboxylic acid which further comprises a hydrophilic functional group other than a carboxyl group, or a salt thereof.

10. The method of claim 9, wherein the chelating agent is 2-hydroxyisobutyric acid (2-HIBA).

11. The method of claim 1, wherein the concentration of the chelating agent in the first eluent is 0.01M to 0.5M.

12. The method of claim 1, wherein the concentration of the aminium ion in the first eluent is 0.01M to 1.0M.

13. The method of claim 1, wherein a purification step by the purification column introduces a second eluent comprising carrier-free lutetium-177 eluted in the separation column into the purification column, and comprises the steps of:

a) eluting the chelating agent and the primary aminium ions included in the first eluent using an organic or inorganic acid having a concentration of 0.1M to 2M as a mobile phase; and b) subsequently eluting carrier-free lutetium-177 with an organic or inorganic acid having a concentration of 3M to 12M as a mobile phase.

* * * * *